United States Patent

Bergevin et al.

(10) Patent No.: US 7,144,518 B2
(45) Date of Patent: Dec. 5, 2006

(54) CMP FOR CORROSION-FREE COFE ELEMENTS FOR MAGNETIC HEADS

(75) Inventors: Christopher W. Bergevin, San Jose, CA (US); Hung-Chin Guthrie, Saratoga, CA (US); Tom King Harris, III, Morgan Hill, CA (US); Ming Jiang, San Jose, CA (US); John Jaekoyun Yang, Newark, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 311 days.

(21) Appl. No.: 10/734,361

(22) Filed: Dec. 11, 2003

(65) Prior Publication Data

US 2005/0127027 A1 Jun. 16, 2005

(51) Int. Cl.
*B44C 1/22* (2006.01)

(52) U.S. Cl. .......................................... 216/22
(58) Field of Classification Search ............ 216/22, 216/89; 438/3
See application file for complete search history.

(56) References Cited

U.S. PATENT DOCUMENTS

| | | | | |
|---|---|---|---|---|
| 5,783,489 A | * | 7/1998 | Kaufman et al. ........... | 438/692 |
| 5,811,355 A | * | 9/1998 | Jordan ....................... | 438/692 |
| 6,066,028 A | * | 5/2000 | Cheng et al. ................ | 451/28 |
| 6,524,376 B1 | | 2/2003 | Aoki et al. ............... | 106/14.42 |
| 6,786,944 B1 | * | 9/2004 | Hattori et al. ............... | 51/307 |
| 2002/0019128 A1 | | 2/2002 | Lee et al. .................. | 438/645 |
| 2002/0111024 A1 | | 8/2002 | Small et al. ................ | 438/689 |
| 2002/0192942 A1 | | 12/2002 | Dinesh ....................... | 438/633 |

* cited by examiner

*Primary Examiner*—Parviz Hassanzadeh
*Assistant Examiner*—Roberts Culbert
(74) *Attorney, Agent, or Firm*—Larry B. Guernsey; Intellectual Property Law Offices

(57) ABSTRACT

A method of manufacture of magnetic heads which include CoFe elements using CMP is presented. The method includes providing a slurry of $Al_2O_3$, adjusting the concentration of $H_2O_2$ in said slurry to within a range of 6–12% by volume and balancing mechanical polishing action. The balancing is done by adjusting the table speed of a mechanical polisher to within a range of 55–90 rpm, and adjusting polishing pressure to within a range of 5–7 psi. Also a magnetic head having elements made of CoFe material made by this method is disclosed.

8 Claims, 10 Drawing Sheets

CMP FOR CORROSION-FREE COFE ELEMENTS FOR MAGNETIC HEADS

BACKGROUND OF THE INVENTION

1. Field of the Invention

The present invention relates generally to magnetic heads and their fabrication, and more specifically to manufacture of pole pieces for write heads which contain elements made of CoFe.

2. Description of the Prior Art

A computer disk drive stores and retrieves data by positioning a magnetic read/write head over a rotating magnetic data storage disk. The head, or heads, which are typically arranged in stacks, read from or write data to concentric data tracks defined on surface of the disks which are also typically arranged in stacks. The heads are included in structures called "sliders" into which the read/write sensors are imbedded during fabrication. The goal in recent years is to increase the amount of data that can be stored on each hard disk. If data tracks can be made narrower, more tracks will fit on a disk surface, and more data can be stored on a given disk. The width of the tracks depends on the width of the poles in read/write heads used, and in recent years, track widths have decreased as the size of read/write heads have become progressively smaller. This decrease in track width has allowed for dramatic increases in the recording density and volume of data storage of disks.

The type of head for writing data is generally configured with two poles separated by a gap layer of non-magnetic material. These are generally referred to as the first pole or P1 and the second pole P2, with a non-magnetic gap layer between them. In order to maximize the density of information on the disk, tracks and the heads that write them are reduced in size further and further. This requires that the magnetic flux which is used to write the data must be channeled and concentrated to smaller and smaller areas. It is now typical that magnetic flux be channeled from a relatively wide structure though a kind of funnel or yoke and concentrated through the very narrow P1 and P2 poles. Although this has worked well in the past, a limit is being approached as far as the ability of the pole tip material to conduct very-high densities of magnetic flux. A quantity known as $B_s$ is a measure of the saturation point of a material for magnetic flux density. The most commonly used material for fabrication of the P1 and P2 poles has been NiFe, which has a $B_s$ of 1.8 T Recently another material CoFe has been explored for use in this application, and CoFe has a higher magnetic moment saturation value of 2.4 T. The implication of this is that poles can be made much narrower with CoFe than with NiFe without encountering the $B_s$ saturation limit.

However, CoFe is more chemically active than NiFe, and chemicals used in manufacturing processes of these magnetic heads can end up damaging the CoFe components, especially during the Chemical Mechanical Polishing (CMP) stages. FIGS. 5–7 show exemplary heads having elements made of CoFe, which have been damaged by pits produced by chemical action during the CMP process, using standard methods and materials.

Thus there is a need for a method and materials for fabricating magnetic heads having elements of CoFe without the damage to components that typically happens using existing CMP processing.

SUMMARY OF THE INVENTION

A method of manufacture of magnetic heads which include CoFe elements using CMP is disclosed. The method includes providing a slurry of $Al_2O_3$, adjusting the concentration of $H_2O_2$ in said slurry to within a range of 6–12% by volume and balancing mechanical polishing action. The balancing is done by adjusting the table speed of a mechanical polisher to within a range of 55–90 rpm, and adjusting polishing pressure to within a range of 5–7 psi.

Also disclosed are a magnetic head having elements made of CoFe made by this method, and a slurry for use in CMP processing of magnetic heads having elements of CoFe material.

It is an advantage of the present invention that it allows for the use of CoFe as a fabrication material for magnetic head elements without the corrosion damage to the CoFe material common in prior CMP processes.

It is another advantage of the present invention that by using CoFe as pole material, the physical dimensions of the poles may be reduced in size, thus allowing smaller tracks and higher densities of media storage.

It is an additional advantage of the present invention that for pole pieces of CoFe material, there are higher yields of undamaged parts and thus less waste and reduced cost.

It is a further advantage that the method of the present invention produces a faster Material Removal Rate (MRR) than that generally used for NiFe elements, thus reducing processing time and increasing throughput.

It is another advantage that by varying the recipe of slurry used for CMP of magnetic heads, the MRR of CoFe can be made to more closely match that of $Al_2O_3$ elements, so that elements of both materials can be planarized in a single CMP processing step.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

Figure 1:
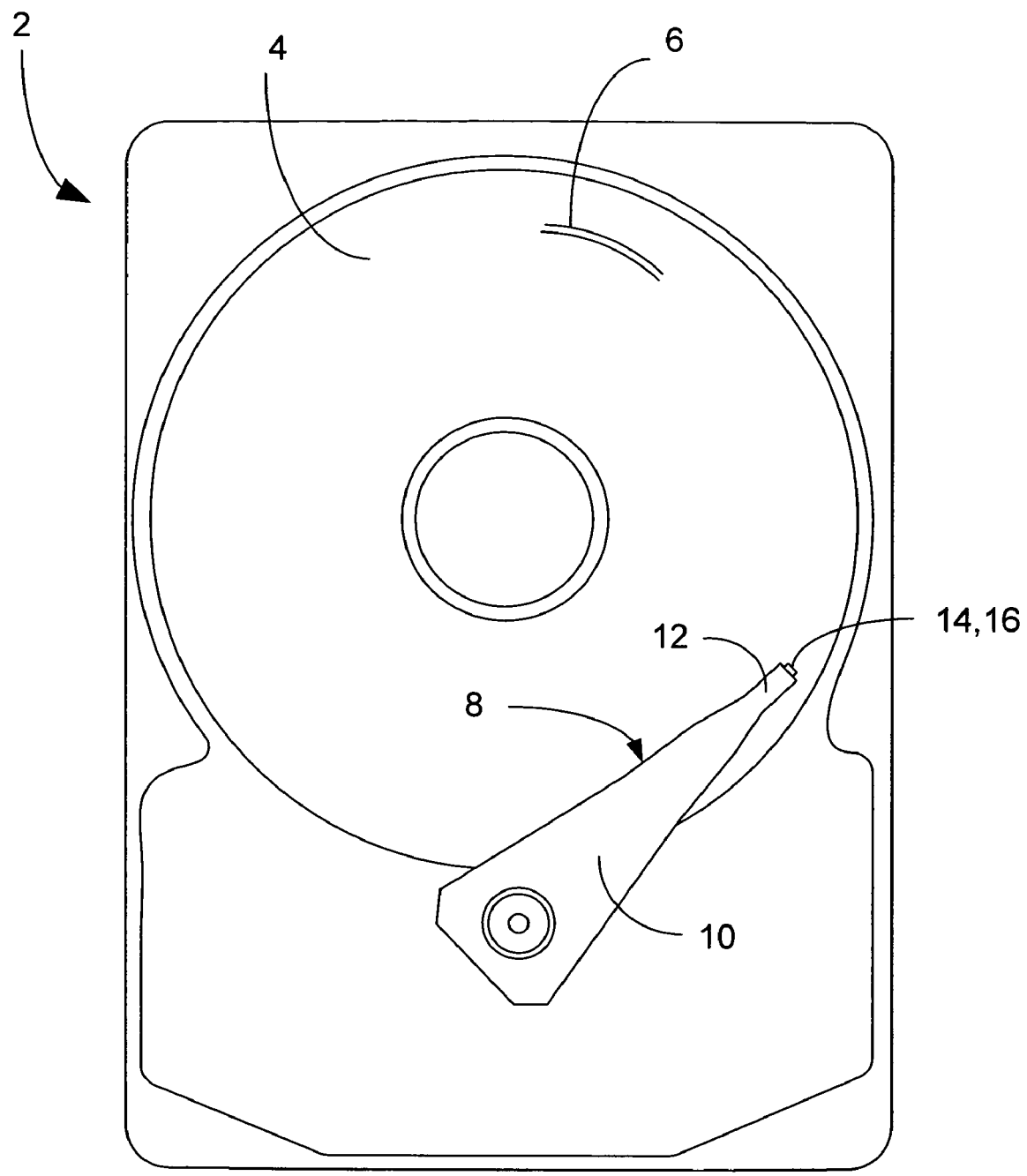
FIG. 1 shows a top plan view of an exemplary disk drive.

A magnetic disk drive 2 is shown generally in FIG. 1, having one or more magnetic data storage disks 4, with data tracks 6 which are written and read by a data read/write device 8. The data read/write device 8 includes an actuator arm 10, and a suspension 12 which supports one or more magnetic heads 14 included in one or more sliders 16.

Figure 2:
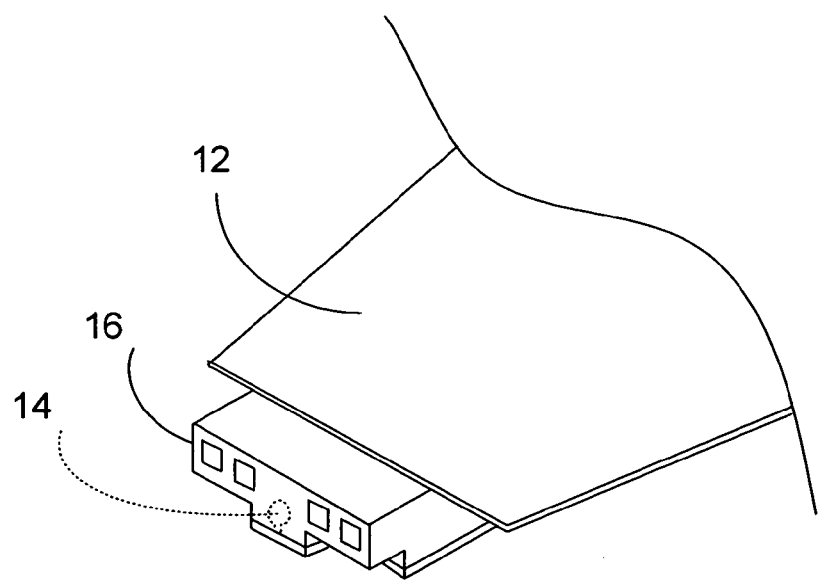
FIG. 2 illustrates a perspective view of view of an exemplary slider and suspension.

FIG. 2 shows a slider 16 in more detail being supported by suspension 12. The magnetic head 14 is shown in dashed lines, and in more detail in FIG. 3. The magnetic head 14 includes a coil 18 and poles 20 having tips 22. The magnetic head 14 flies on an air cushion between the surface of the disk 4 and the air bearing surface (ABS) 24 of the slider 16.

Figure 3:
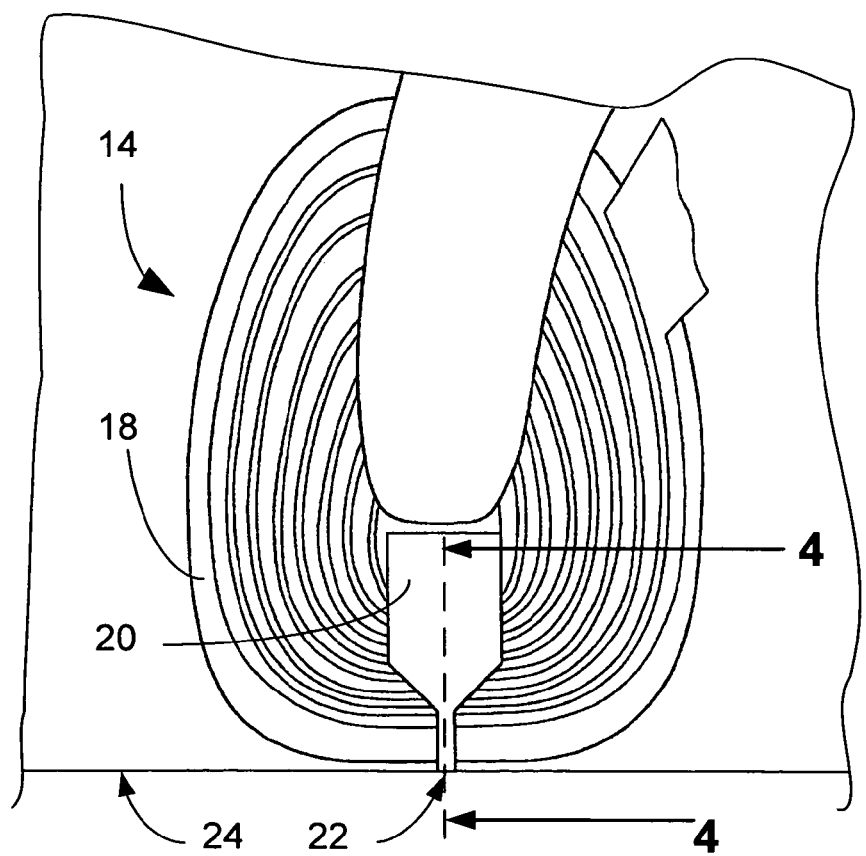
FIG. 3 shows a top plan view of an exemplary read/write head.
Figure 4:
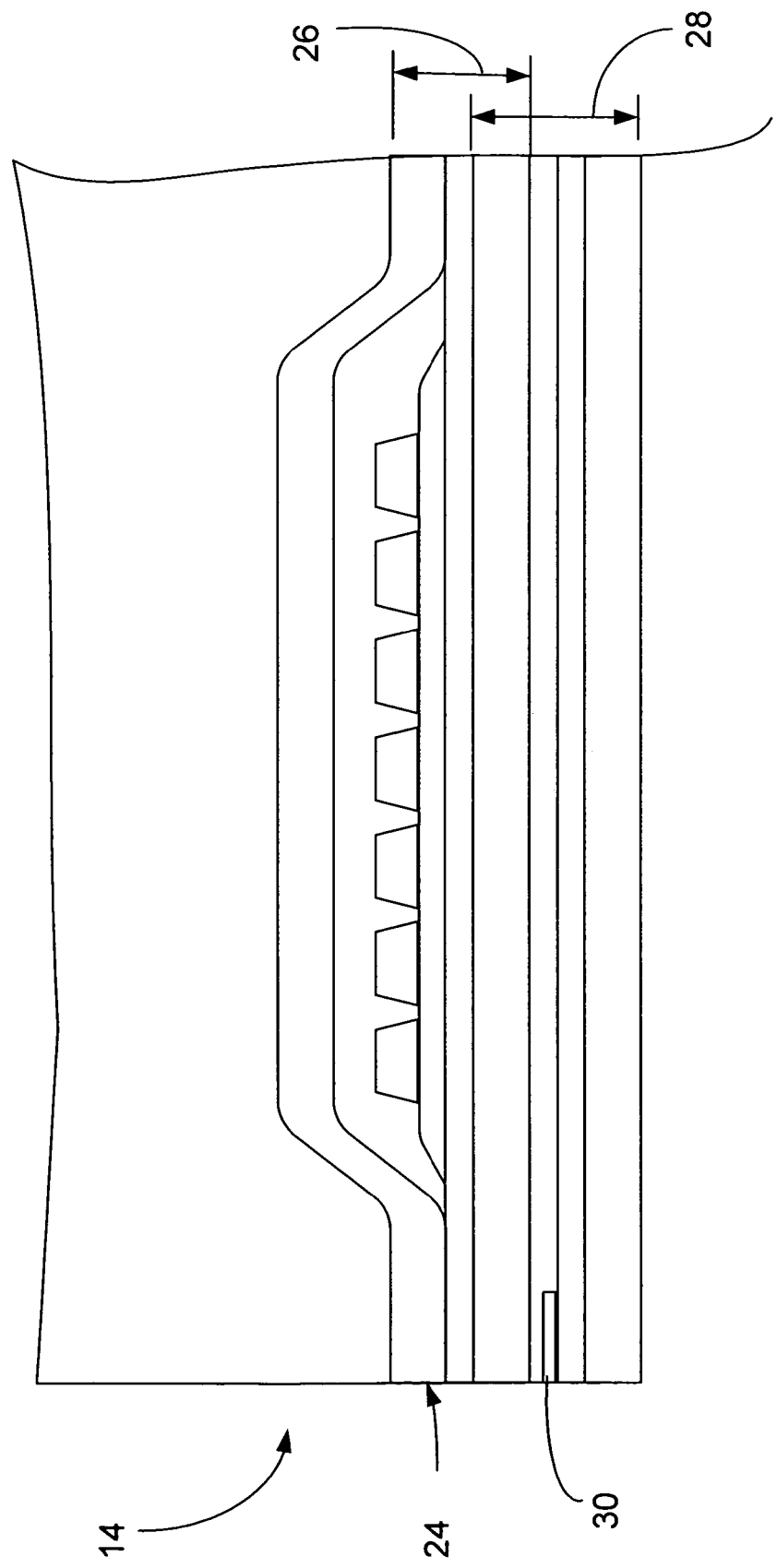
FIG. 4 is a cross-section view of an exemplary read/write head as taken through plane 4—4 of FIG. 3.

FIG. 4 is a cut-away view of the magnetic head 14 structure as taken from line 4—4 of FIG. 3. The write head portion 26 and the read head portion 28 are generally shown, with the read head sensor 30 and the ABS 24. The write head 26 in the present invention has elements of CoFe material, for which there are special problems in the manufacturing process.

In magnetic heads for writing data, the magnetic flux which is used to write the data must be channeled and concentrated to very small areas. It is now typical that magnetic flux be channeled from a relatively wide structure though a kind of funnel or yoke and concentrated through the very narrow P1 and P2 poles. A limit is being approached as far as the ability of the pole tip material to conduct very high densities of magnetic flux. A quantity known as $B_s$ is a measure of the saturation point of a material for magnetic flux density. The most commonly used material for fabrication of the P1 and P2 poles has been NiFe, which has a $B_s$ of 1.8 T. Recently another material CoFe has been explored for use in this application, and CoFe has a higher magnetic moment saturation value of 2.4 T. The implication of this is that poles can be made much narrower with CoFe than with NiFe without encountering the $B_s$ saturation limit.

However, CoFe is more chemically active than NiFe, and chemicals used in manufacturing processes of these magnetic heads can end up damaging the CoFe components, especially during the Chemical Mechanical Polishing (CMP) stages.

Figure 5:
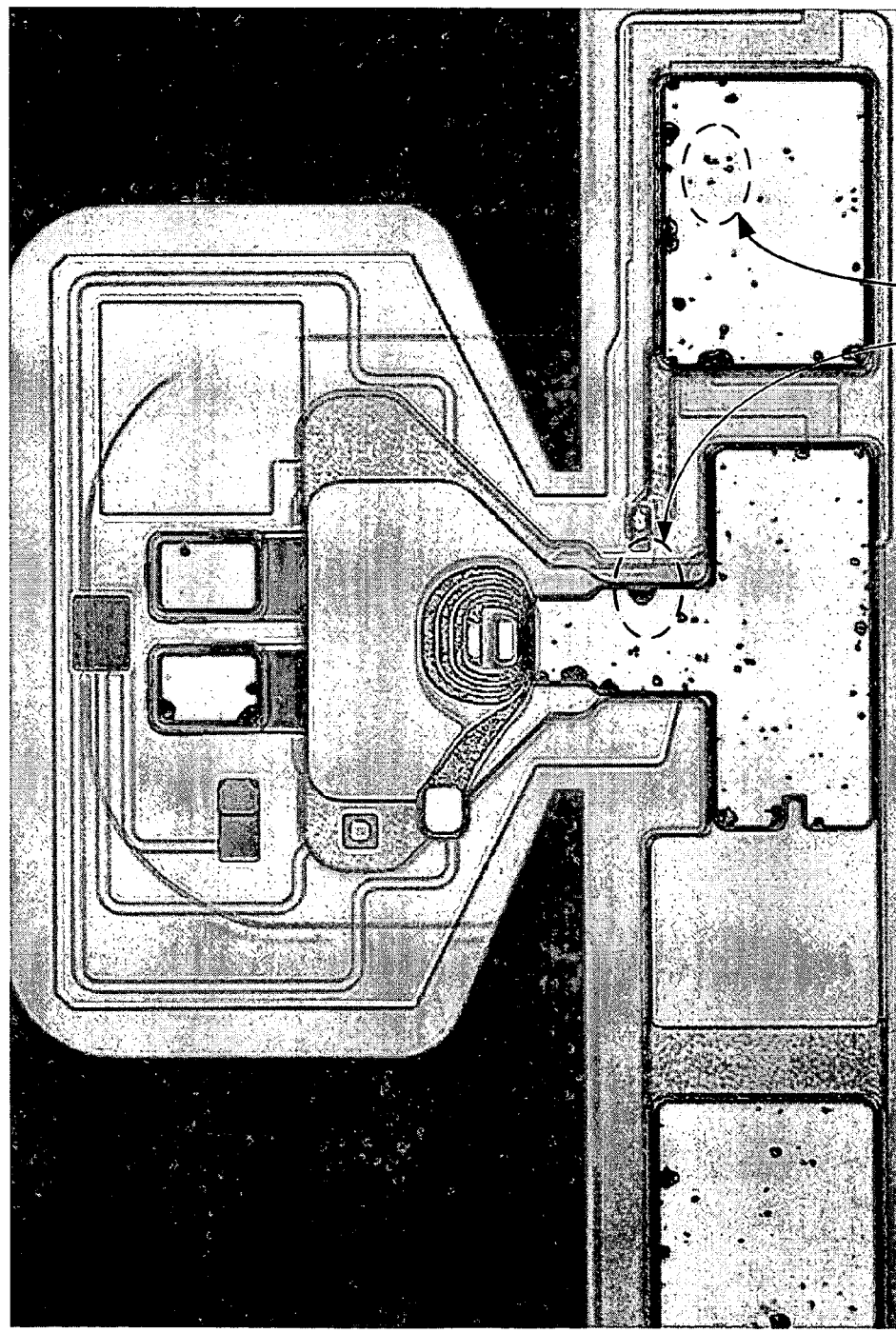
FIG. 5 (prior art) is a detail view of a magnetic head of CoFe made by prior art processes showing pitting corrosion caused by these prior art CMP processes.
Figure 7:
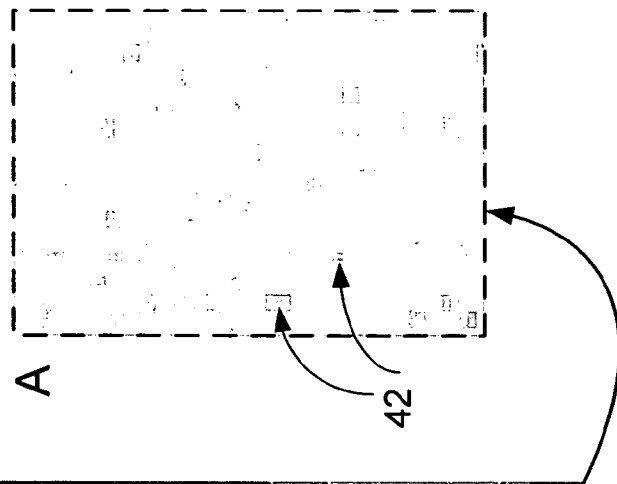
FIG. 7 (prior art) is a close-up detail view of the area enclosed by box A in FIG. 6, showing pin hole corrosion caused by prior art CMP processes.
Figure 6:
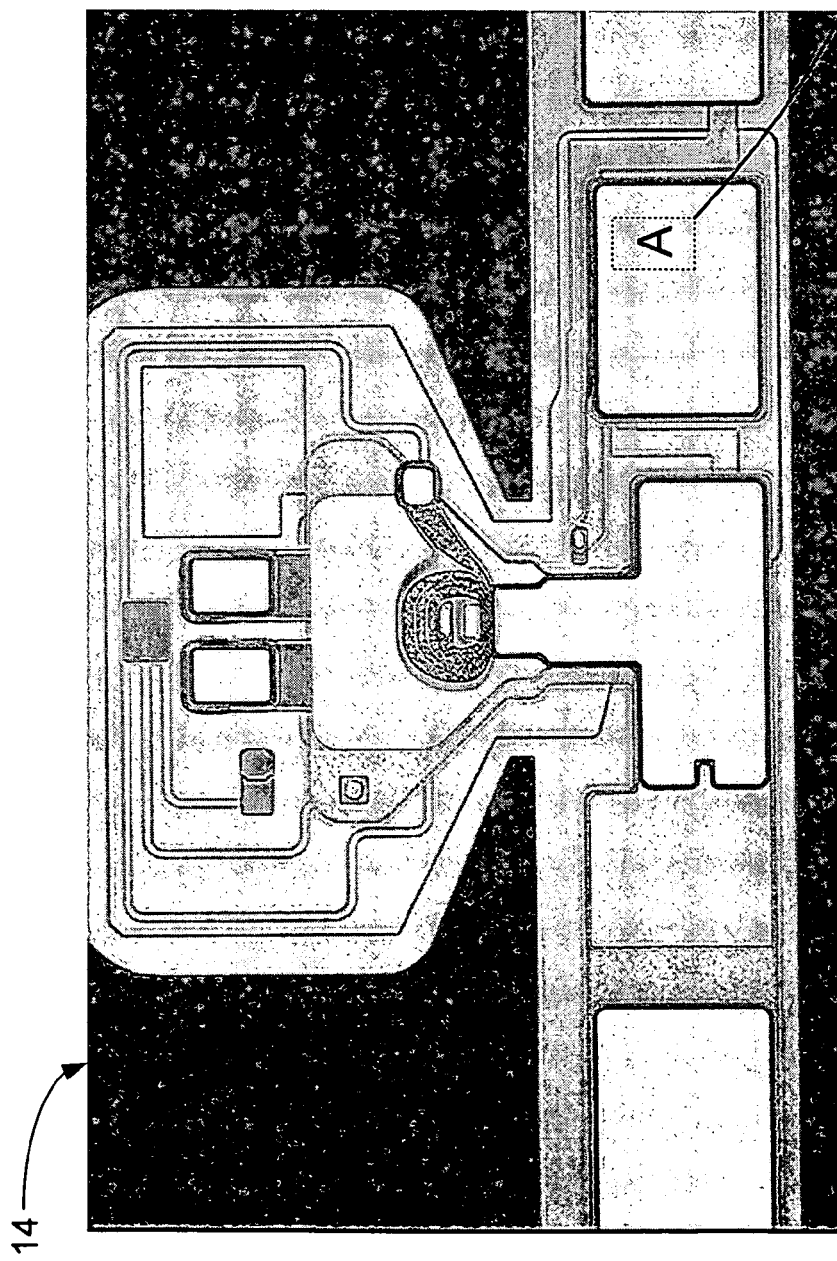
FIG. 6 (prior art) is a detail view of a magnetic head of CoFe made by prior art processes showing pin hole corrosion caused by these prior art CMP processes.

FIG. 5 (prior art) shows an exemplary head 14 with elements made of CoFe, which has been damaged by pits 40 produced by chemical action during the NiFe CMP process, using standard methods and materials. The areas surrounded by dashed lines show representative pits and corrosion In FIGS. 6–7 (prior art) a multi-step multi-slurry process has been used to process the magnetic head 14. The corrosion is more subtle than in the NiFe process, but in FIG. 7, showing an enlarged detail view of the area A in FIG. 6 which is within the dashed rectangle, there is still evidence of pinhole corrosion 42. This damage comes about not primarily from the chemical action but by an imbalance in the mechanical polishing processes, from the table speed and/or pressure being unbalanced.

Figure 8:
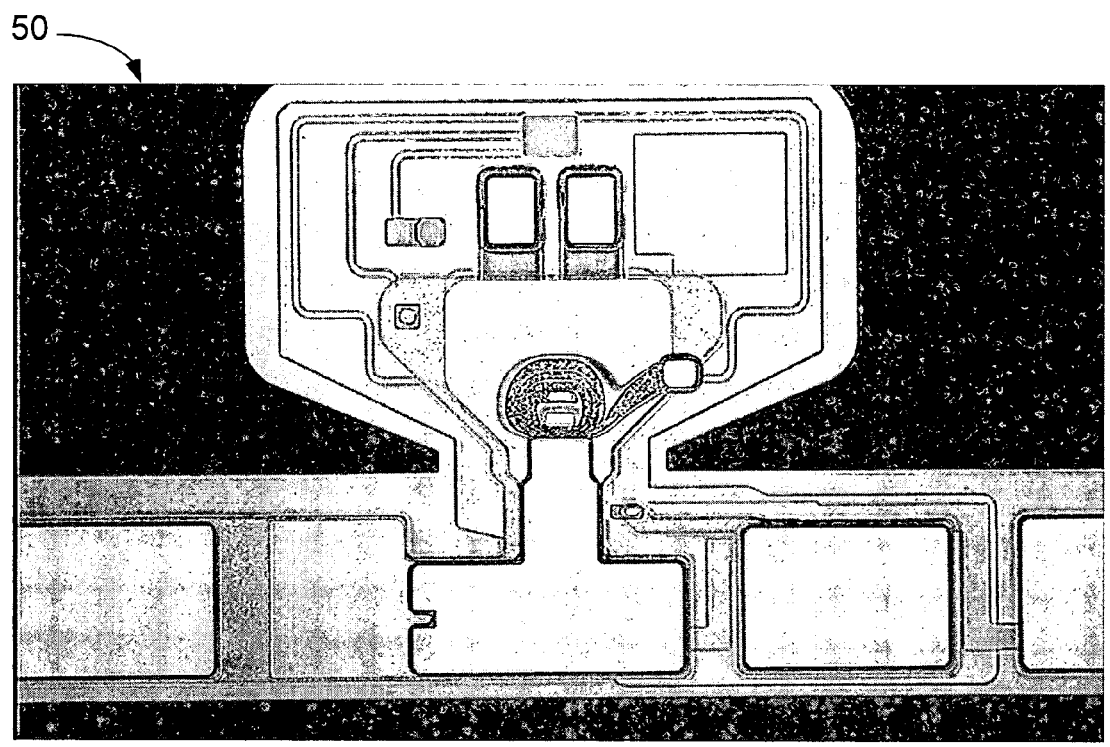
FIG. 8 is a detail view of a magnetic head of CoFe made by the process of the present invention showing the lack of pitting and pinhole corrosion.
Figure 9:
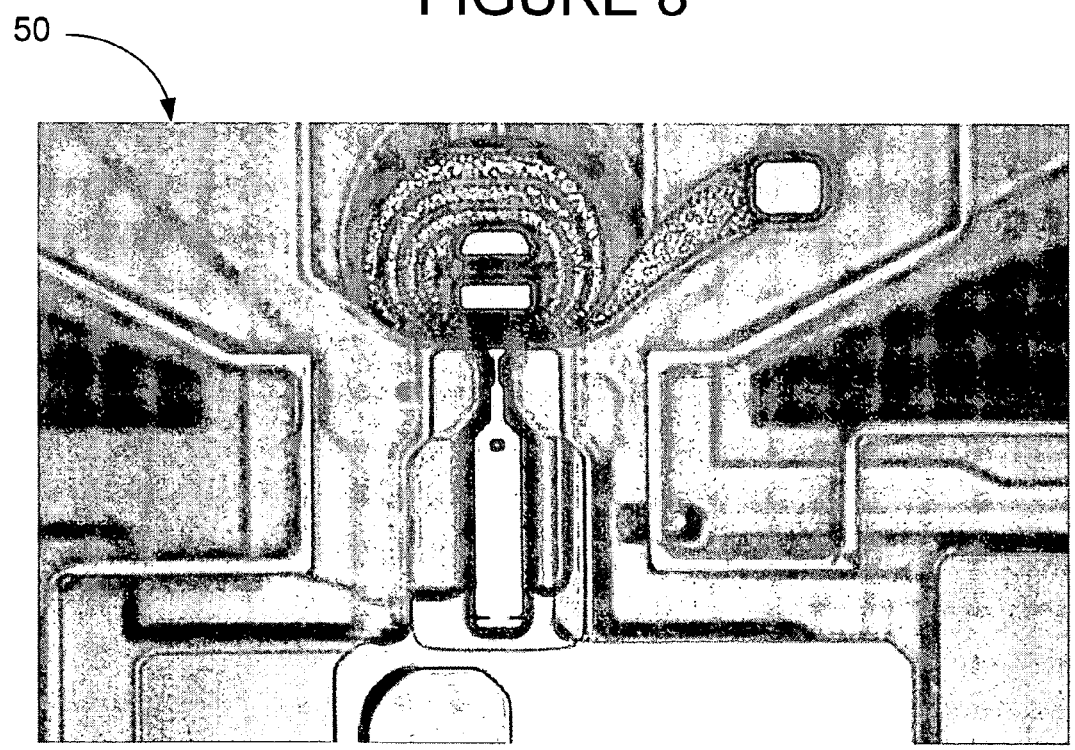
FIG. 9 is a close-up detail view of a magnetic head of CoFe made by the process of the present invention showing the lack of pitting and pinhole corrosion.

In contrast, FIGS. 8 and 9 show exemplary magnetic heads 50 having elements made from CoFe made by the process of the present invention, which are free from corrosion. It has been found that the proper balance of chemical activity, and mechanical action and pressure is very important to achieve final surface finish and planarity in CoFe heads.

There are three main variables in CMP processing, the chemical composition of the slurry, the table speed of the polishing device and the pressure. In typical NiFe processing, a slurry of SiO2 with a pH 9–10 is used with a table speed of 35–50 rpm and a pressure of 6 psi.

For the new method for CoFe processing, it is preferred to use higher polishing speeds and pressure. The table speed is preferably in the range of 55–90 rpm, and the polishing pressure range is generally from 5–7 psi.

As for the chemical composition, it is preferred to use a slurry of $Al_2O_3$ having an abrasive size in the range of 50–500 nm with a pH of 4–6, with BTA (1H-benzotriazole) as a corrosion inhibitor, Isothiazolone as an industrial biocide, and $H_2O_2$ as an oxidizer. It has been discovered that the $H_2O_2$ concentration in slurry is critical to achieve a planar surface and to avoid CoFe corrosion.

The present inventors have found that by introducing a concentration of greater than 6% $H_2O_2$ by volume, corrosion in CoFe parts substantially improves. In concentrations less than 6%, corrosion is lessened, but the preferred range for corrosion protection is greater than 6%. However, there are other factors in the manufacturing process that must be taken into account in setting the "recipe" for the chemical slurry.

Figure 10:
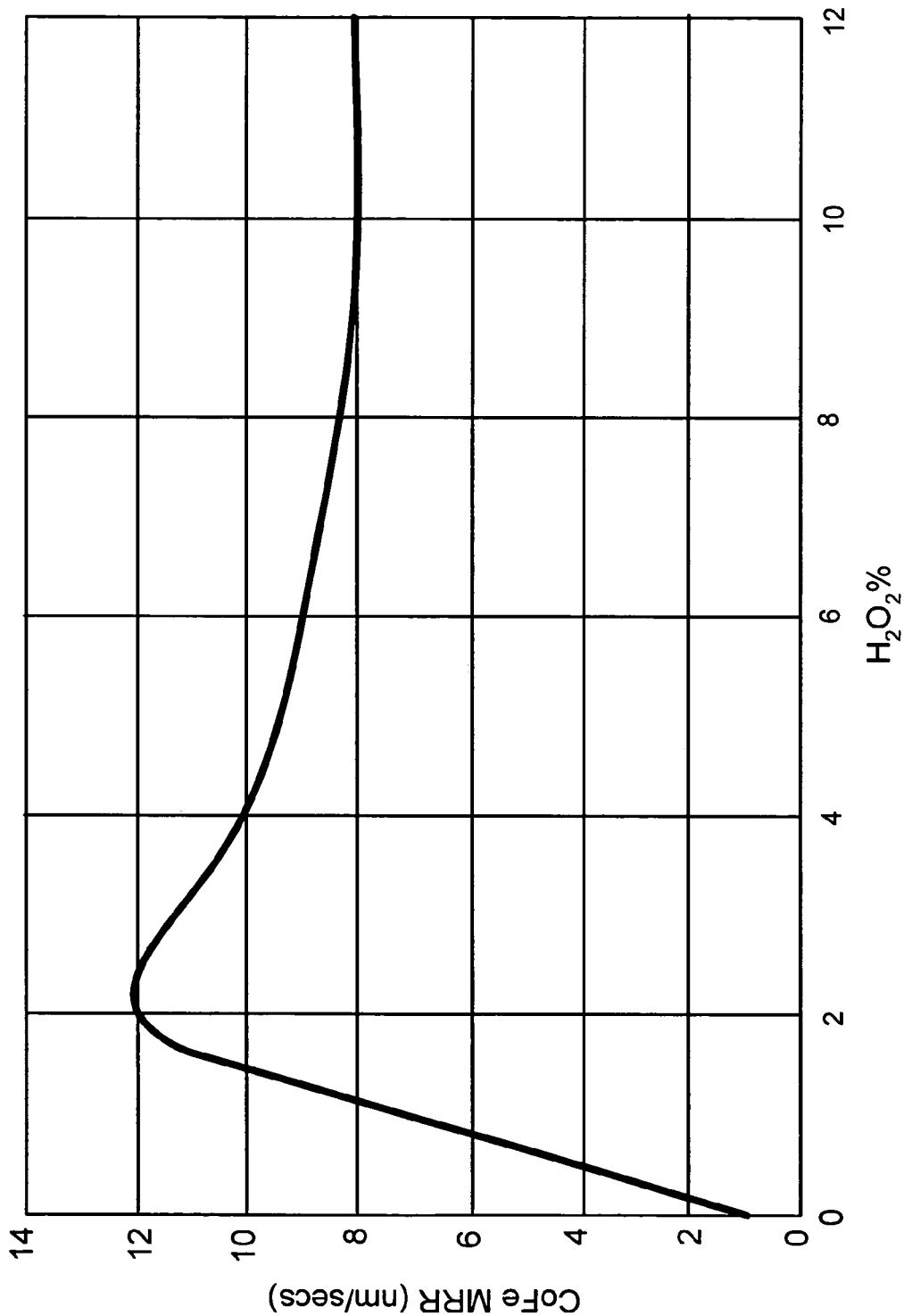
FIG. 10 is a graph showing the polishing rate for CoFe as a function of $H_2O_2$ concentration.

FIG. 10 shows a graph of CoFe Material Removal Rate (MRR) versus $H_2O_2$ percentage concentration. It can be seen that the rate of material removal, as measured in nm/sec, peaks early around 2% concentration of $H_2O_2$, and then recedes gradually coming to an equilibrium around 10%. As discussed above, the range of concentrations above 6% has been found to produce CoFe parts that are free from corrosion.

As referred to above, besides the factor of corrosion in parts, there are other factors which are important in designing a manufacturing process for magnetic heads that is efficient and cost effective with a minimal number of processing steps. In magnetic heads, parts are preferably made not only of CoFe, but many are preferably made also of $Al_2O_3$. There may be alternating elements of $Al_2O_3$ and CoFe which must be planarized together to make a flat surface. Thus it is important that the material removal rates be adjusted so that MRR of one material is comparable with the MRR of the other. It is thus important that the slurry mixture be adjusted for this factor as well.

Figure 11:
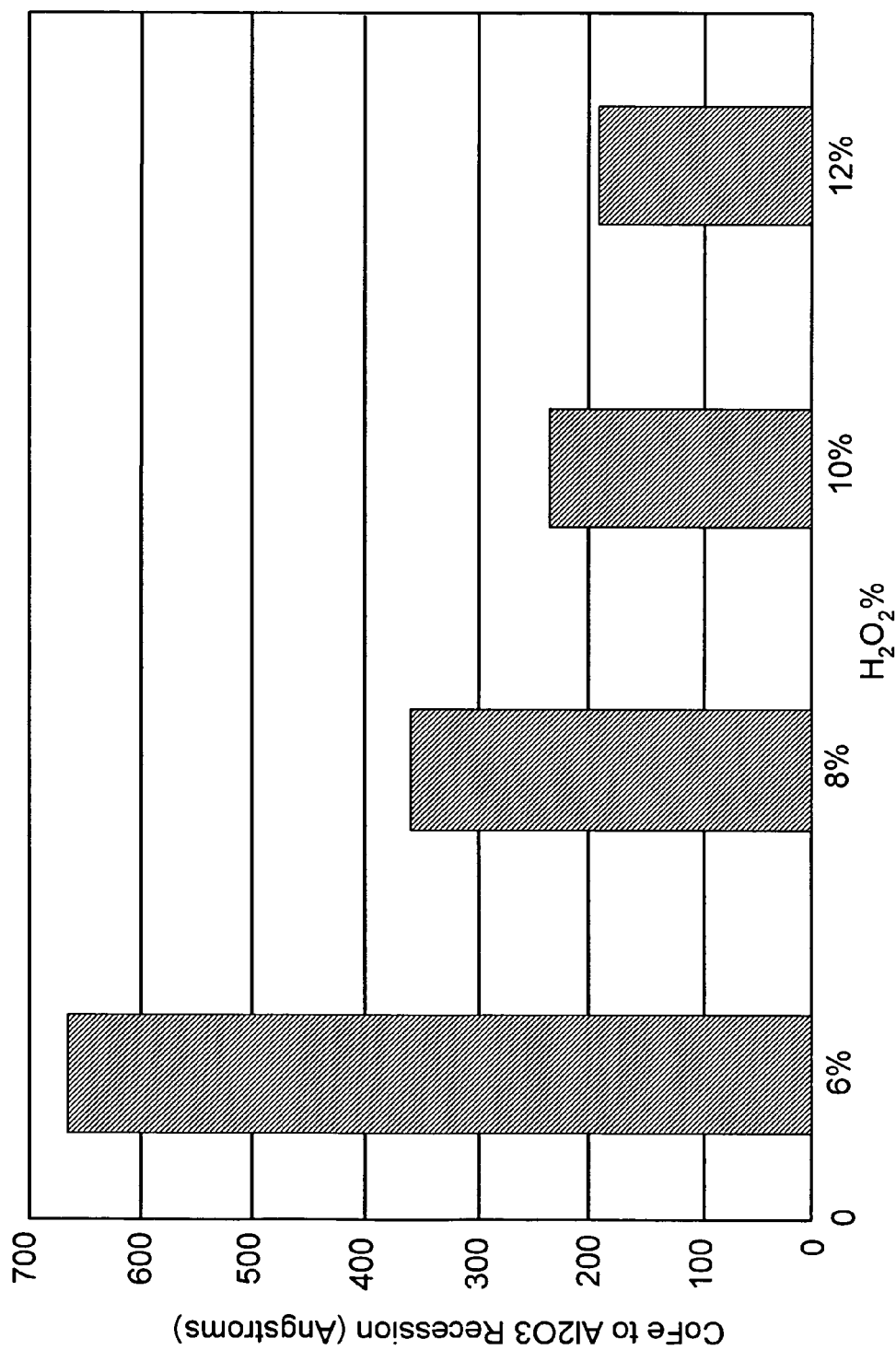
FIG. 11 is a graph showing recession of CoFe relative to $Al_2O_3$ material as a function of $H_2O_2$ concentration.

FIG. 11 shows a graph of CoFe to $Al_2O_3$ recession in Angstroms, as the $H_2O_2$ percentage is increased. It is not shown here, but without $H_2O_2$, the $Al_2O_3$ is initially removed much faster than the CoFe. As the $H_2O_2$ concentration increases, the $Al_2O_3$ removal rate is unchanged, but the CoFe removal rate rose to a peak and then declined and stabilized at higher concentrations. This is important is adjusting the CoFe surface level to that of the $Al_2O_3$ surface so that it results in a planar surface within a single CMP processing step. In order to achieve this, the preferred concentration of $H_2O_2$ is in the range of 8–12%.

Figure 12:
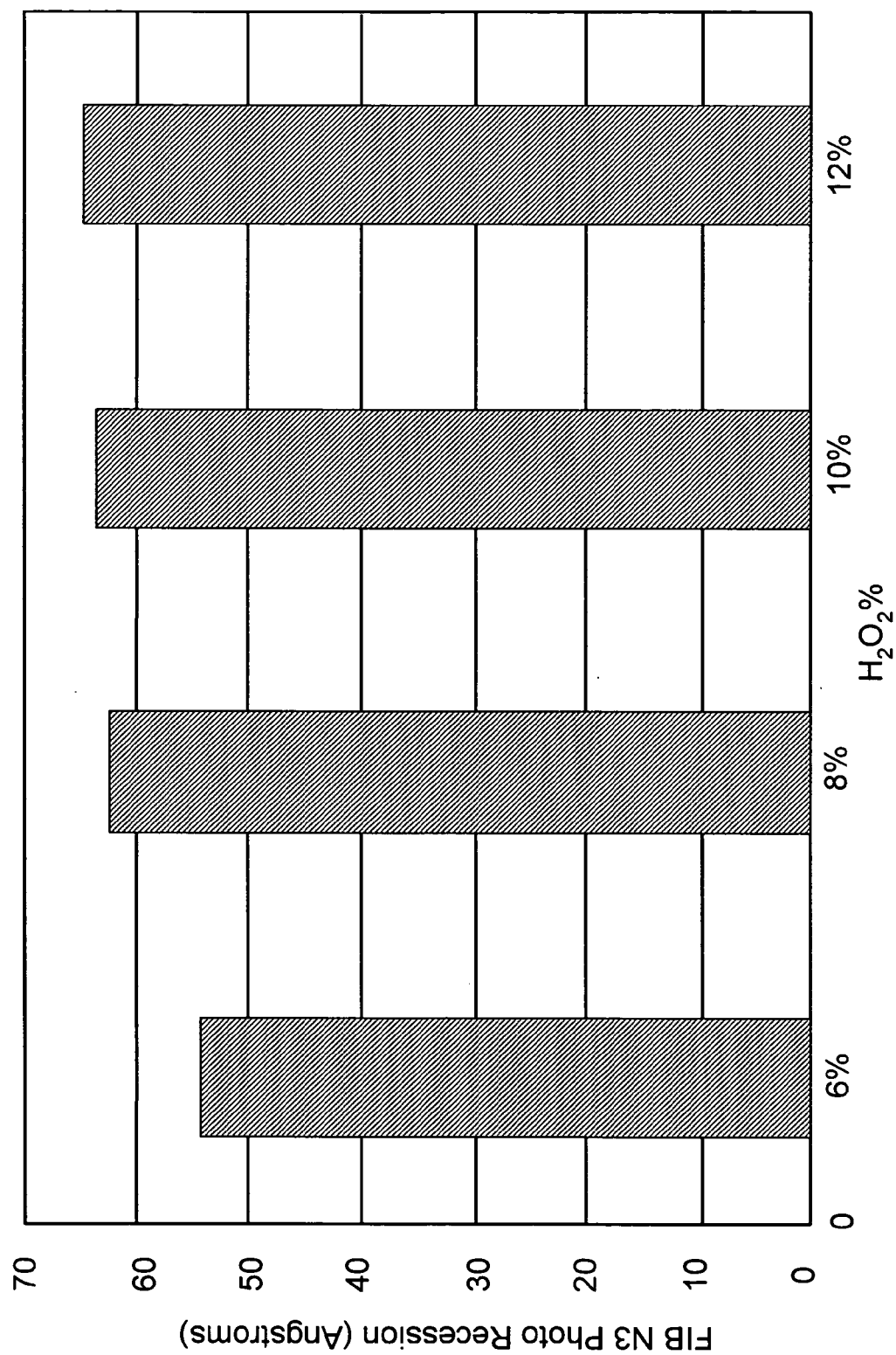
FIG. 12 is a graph showing recession of photoresist layer material relative to the pole piece as a function of $H_2O_2$ concentration.

FIG. 12 shows a graph of the amount of recession of the FIB photoresist material relative to the N3 pole piece made of CoFe, when the concentration of $H_2O_2$ is increased. The graph shows that the recession increases with increased concentration, but steadily levels off in the range of 8–12% concentration to an acceptable level of 65 angstroms or less.

The importance of this is that by using this range of concentrations for the benefit of the other factors, discussed above, the photoresist layers are not damaged as a secondary effect.

Figure 13:
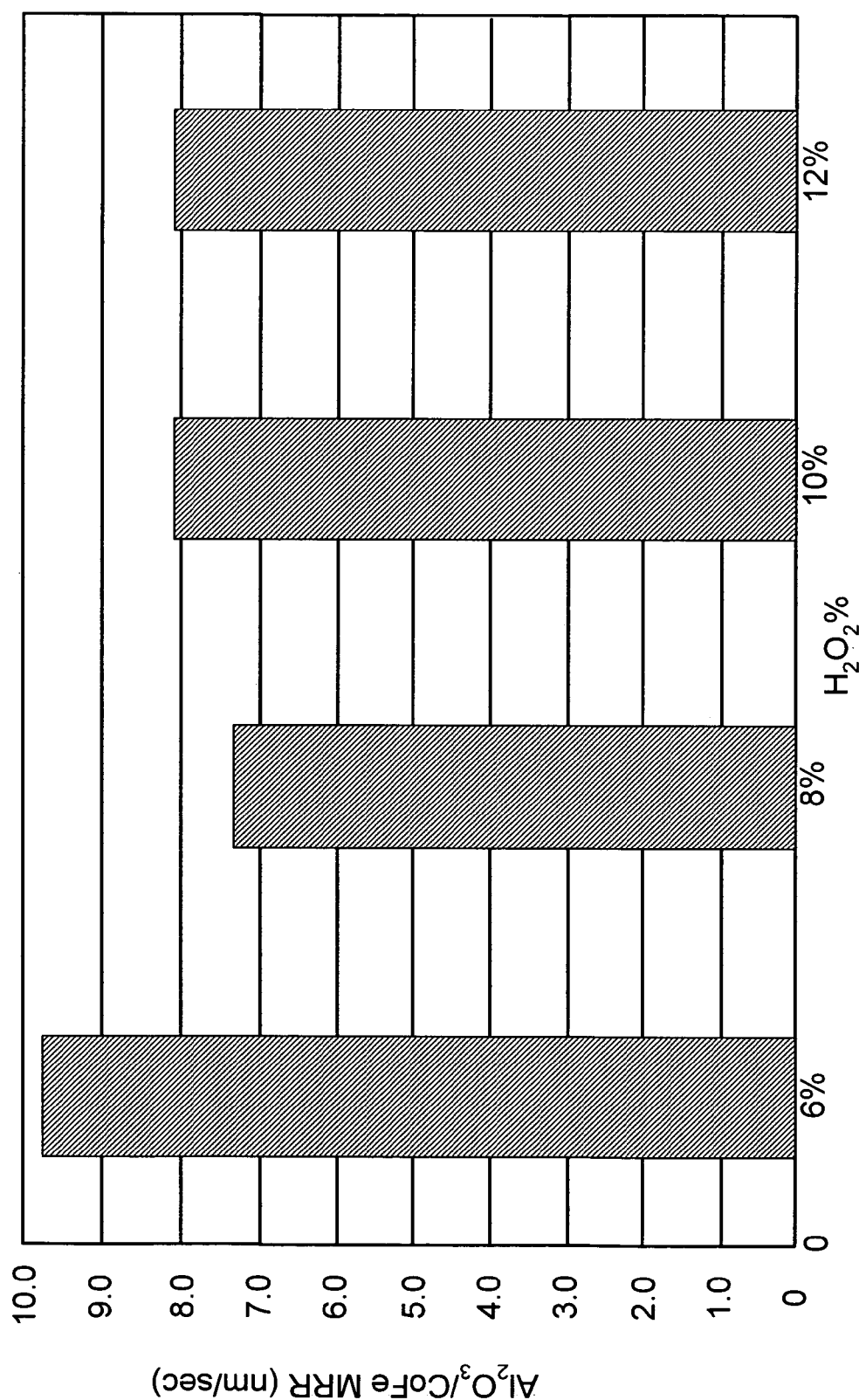
FIG. 13 is a graph showing the polishing rate for $Al_2O_3$/CoFe as a function of $H_2O_2$ concentration.

FIG. 13 shows the Material Removal Rate (MRR) of the $Al_2O_3$ and CoFe in nm/sec. As discussed above, the MRR is highest around 6%, then drops off around 8% before stabilizing in the range of 10–12% around 8 nm/sec, which is an improvement over the MRR for NiFe which is generally found to be 6 nm/sec.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What is claimed is:

1. A method of manufacture of magnetic heads which include CoFe elements using CMP, comprising:
- A) providing magnetic heads which include CoFe elements;
- B) providing a slurry including $Al_2O_3$ and $H_2O_2$;
- C) adjusting the concentration of $H_2O_2$ in said slurry to within a range of 6–12% by volume;
- D) polishing said CoFe elements using said slurry; and
- E) balancing mechanical polishing action.

2. The method of manufacture of magnetic heads of claim 1, wherein C) includes: adjusting the table speed of a mechanical polisher to within a range of 55–90 rpm.

3. The method of manufacture of magnetic heads of claim 2, wherein C) includes:
adjusting polishing pressure to within a range of 5–7 psi.

4. The method of manufacture of claim 1, wherein:
said slurry of A) includes BTA (1H-benzotriazole).

5. The method of manufacture of claim 1, wherein:
said slurry of A) includes Isothiazolone.

6. The method of manufacture of claim 1, wherein:
the particle size of $Al_2O_3$ is in the range of 50–500 nm.

7. The method of manufacture of claim 1, wherein:
the pH of the slurry is in the range of 4–6.

8. A method of manufacture of magnetic heads which include CoFe elements using CMP, comprising:
- A) providing magnetic heads which include both CoFe elements and $Al_2O_3$ elements;
- B) providing a slurry including $Al_2O_3$ and $H_2O_2$;
- C) adjusting the concentration of $H_2O_2$ in said slurry to within a range of 8–12% by volume;
- D) polishing said CoFe elements and said $Al_2O_3$ elements using said slurry; and
- E) balancing mechanical polishing action.

* * * * *